United States Patent [19]
Kanetka et al.

[11] 3,867,405
[45] Feb. 18, 1975

[54] PROCESS FOR PREPARING N-(BETA-HYDROXYETHYL)-2-PYRROLIDONE

[75] Inventors: Junichi Kanetka; Takashi Shimodaira, both of Ami-machi, Japan

[73] Assignee: Mitsubishi Petrochemimcal Co., Ltd., Tokyo, Japan

[22] Filed: Feb. 28, 1973

[21] Appl. No.: 336,774

[30] Foreign Application Priority Data
Mar. 17, 1972 Japan.............................. 47-27150

[52] U.S. Cl..................... 260/326.5 FL, 260/561 A
[51] Int. Cl............................................. C07d 27/08

[58] Field of Search ......................... 260/326.5 FL

[56] References Cited
UNITED STATES PATENTS
2,669,570    2/1954    Schnizer ......................... 260/326.5

Primary Examiner—Joseph A. Narcavage
Attorney, Agent, or Firm—Oblon, Fisher, Spivak, McClelland & Maier

[57] ABSTRACT

In a process for preparing N-($\beta$-hydroxyethyl)-2-pyrrolidone by reacting $\gamma$-butyrolactone with monoethanolamine at a temperature of 150°–400°C, the improvement which comprises adding a suitable amount of water to the condensation reaction system.

7 Claims, No Drawings

PROCESS FOR PREPARING N-(BETA-HYDROXYETHYL)-2-PYRROLIDONE

BACKGROUND OF THE INVENTION

1. Field of the Invention

This invention relates to a process for preparing N-(β-hydroxyethyl)-2-pyrrolidone by reacting γ-butyrolactone with monoethanloamine.

2. Description of the Prior Art

N-(β-hydroxyethyl)-2-pyrrolidone is effective as an intermediate for preparing N-vinylpyrrolidone which is a monomer starting material useful for the preparation of polyvinylpyrrolidone. Polyvinylpyrrolidone is a material which has various uses.

Processes such as dehydration of N-(β-hydroxyethyl)-2-pyrrolidone have been known to be useful for the production of N-vinylpyrrolidone. A standard process for the production of N-substituted-2-pyrrolidone (C) is the thermal reaction of γ-butyrolactone (A) with a primary amine (B) in the absence of a catalyst as shown in the following reaction.

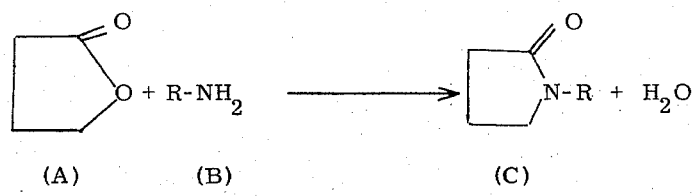

When monoethanolamine is used as the primary amine (B), N-(β-hydroxyethyl)-2-pyrrolidone is obtained as the product. It has been disclosed that N-(β-hydroxyethyl)-2-pyrrolidone can be prepared in yields of 88–90 mole percent by reacting γ-butyrolactone with monoethanolamine (Journal American Chemical Society 74, 4959 (1952) and U.S. Pat. No. 2,669,570).

While the yields of N-(β-hydroxyethyl)-2-pyrrolidone produced by the condensation reaction above are relatively high, it is not clear why the yield of the pyrrolidone product was limited to about 90 percent. Repetition of the prior art procedures confirmed that 90 percent yields as a maximum could be obtained by adjusting reaction variables such as reaction temperature, reaction time and the mole ratio of γ-butyrolactone to amine.

A need, therefore, exists for a method of producing N-(β-hydroxyethyl)-2-pyrrolidone in yields greater than 90 percent. This objective has been accomplished as a consequence of studies concerning the rate of the reaction and product analysis.

SUMMARY OF THE INVENTION

It is an object of this invention to provide a process for preparing N-(β-hydroxyethyl)-2-pyrrolidone in high yield.

This object and other objects of this invention as hereinafter will become apparent can be attained by providing a process for preparing N-(β-hydroxyethyl)-2-pyrrolidone by reacting γ-butyrolactone with monoethanolamine wherein a suitable amount of water is added to the condensation reaction system.

DESCRIPTION OF THE PREFERRED EMBODIMENTS

In the reactions of γ-butyrolactone with monoethanolamine, the following reaction sequence is believed to occur.

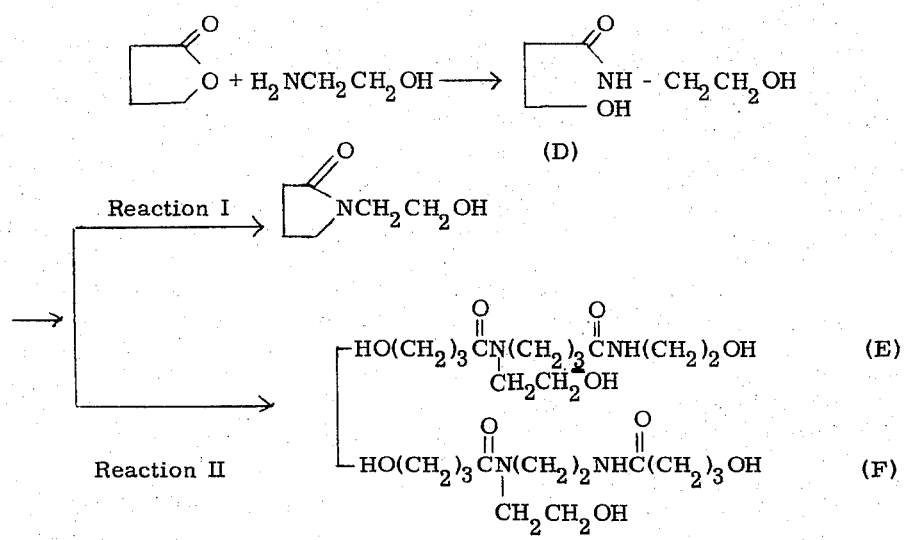

The following facts are known.

First, γ-butyrolactone reacts with monoethanolamine to produce γ-hydroxy-N(β-hydroxyethyl)-butylamide (D). Second, the desired product N-(β-hydroxyethyl)-2-pyrrolidone, is formed by the intramolecular condensation of the amide (D), (Reaction I). However, if an intermolecular condensation reaction occurs between two molecules of amide (D), (Reaction II), dimer amides (E) or (F) are formed. These dimers may undergo further reactions with amide (D) to form polymeric products. The polymer obtained by this reaction has an average molecular weight of about 500 and is considered to be a condensation product of five molecules of the amide (D).

The results of the study of the reaction rate indicate that the condensation reaction is greatly affected by water. It has been found that when the condensation reaction is performed under reaction conditions free of moisture, the condensation reaction between two molecules of the amide (D) (Reaction II) preferably occurs. On the other hand, if excessive amounts of water are present in the condensation reaction system, Reaction (II) is inhibited and Reaction (I) is promoted. In accordance with the process of this invention, it has been found that yields of N-(β-hydroxyethyl)-2-pyrrolidone can be increased to 98 percent by the addition of suitable amounts of water at the initiation of the condensation reaction. These results are superior to the 90 percent yields achieved by conventional processes.

The process of this invention is characterized by the addition of a suitable amount of water to the condensation reaction for the preparation of N-(β-hydroxyethyl)-2-pyrrolidone by the reaction of γ-butyrolactone with monoethanolamine. Normally, water is removed as it is produced in the condensation reactions. However, an unexpected increase in the yield of N-(β-hydroxyethyl)-2-pyrrolidone, as shown by this invention, results upon the addition of water to the condensation reaction system.

The unique effect water has on the reaction system is not a dilution effect, because the addition of the other solvents such as alcohols or ethers to the reaction system does not result in an increase in the yield of pyrrolidone product. Thus, the effect water exerts on the reaction of γ-butyrolactone with monoethanolamine occurs as a result of some unexplained mechanism.

The amount of water which may be suitably added to the reaction system depends upon the reaction conditions. If the amount of water is too small, the effect of the water is slight and the yield of product is not significantly increased. Accordingly, more than about 3 percent by weight, preferably more than 5 percent by weight of water to the total weight of γ-butyrolactone and monoethanolamine is added to the condensation reaction system. If increasingly larger amounts of water are added to the condensation reaction system, the yield of N-(β-hydroxyethyl)-2-pyrrolidone is significantly increased, and the rate of reaction decreases. In addition, separation and purification of the product becomes complicated and uneconomical. From this viewpoint, the optimum amount of water added to the condensation reaction system should be in the range of 5–100 percent by weight of the total weight of γ-butyrolactone and monoethanolamine.

The addition of water to the condensation reaction system can be accomplished in several ways. For example, it is possible to add the total amount of water needed to the system at the initiation of the reaction or in the initial stages of the reaction. It is also possible to add water continuously or intermittently to the system depending upon the progress of the condensation reaction. Yet another method is to add water to one of the starting materials or both of of the starting materials before the reactants are mixed.

The reaction temperature of the condensation reaction can be from 150° – 400°C, preferably 220° – 300°C. The reaction period can be from 1–8 hours. The molar ratio of γ-butyrolactone to monoethanolamine can be selected to fall within a suitable range. It is advantageous to add equimolar amounts of the reactants, or up to a 5–10 mole percent excess of γ-butyrolactone to the system because monoethanolamine is thermally more unstable than γ-butyrolactone and because it is more active than γ-butyrolactone. Accordingly, high yields of product can be achieved by rapidly completing the condensation reaction so as to inhibit secondary reactions.

The condensation reation can be performed under atmospheric pressure while exposed to the air. However, because of the presence of water, suitable reaction temperatures are difficult to achieve. This results in long reaction times or lower reaction rates. Accordingly, it is preferable to perform the condensation reaction in a sealed autoclave wherein the pressure corresponding to the partial vapor pressure of water is increased. It is also possible to perform the condensation reaction under higher pressures.

Having generally described this invention, a further understanding can be obtained by reference to certain specific examples which are provided herein for purposes of illustration only and are not intended to be limiting unless otherwise specified.

EXAMPLE 1 a. In a 2 l stainless steel autoclave equipped with an inductive stirrer, 500 g of γ-butyrolactone and 500 g of monoethanolamine were admixed together with 214 g of water.

After purging the reactor with nitrogen, the temperature of the reactor was increased by electric heating while slowly stirring. After the temperature reached 260°C, the reaction was continued with vigorous stirring for 3 hours until the pressure of the reactor reached 30 kg/cm².

After the reaction, the reactor was cooled and the reaction product was removed and distilled under reduced pressure (2 mm Hg). A 731 g amount of N-(β-hydroxyethyl)-2-pyrrolidone was obtained as a fraction boiling from 140°–145°C. According to gas chromatographic analysis, the purity of the product was 99.4 percent by weight. Thus, the yield of product was 96.9 mole percent.

b. As a reference experiment, Example 1 (a) was repeated except that no water was added to the reactant. As a result, the yield of N-(β-hydroxyethyl)-2-pyrrolidone was 89.5 mole percent.

EXAMPLES 2–7

Various experiments in which the amount of water was changed, were conducted under a reaction temperature of 260°C and a reaction period of 3 hours. The reactor and procedure of Example 1 were used. The results are shown in Table I.

TABLE 1

| Example | Reaction Condition | | | amount of water to the total amount of (A) + (B) (%) | yield of N-(β-hydroxethyl)-2-pyrrolidone (mole %) |
|---|---|---|---|---|---|
| | γ-butyrolactone (A) charged amount (g) | monoethanolamine (B) charged amount (g) | Water (C) charged amount (g) | | |
| 1 (b) | 500 | 355 | 0 | 0 | 89.5 |
| 2 | 500 | 355 | 43 | 5 | 92.0 |

TABLE 1—Continued

| Example | Reaction Condition γ-butyrolactone (A) charged amount (g) | monoethanolamine (B) charged amount (g) | Water (C) charged amount (g) | amount of water to the total amount of (A) + (B) (%) | yield of N-(β-hydroxethyl)-2-pyrrolidone (mole %) |
|---|---|---|---|---|---|
| 3 | 500 | 355 | 86 | 10 | 94.0 |
| 1 (a) | 500 | 355 | 214 | 25 | 96.9 |
| 4 | 500 | 355 | 423 | 50 | 97.7 |
| 5 | 500 | 355 | 573 | 67 | 98.0 |
| 6 | 300 | 213 | 513 | 100 | 98.0 |
| 7 | 300 | 213 | 1,180 | 230 | 98.0 |

EXAMPLE 8

In the autoclave of Example 1, 500 g of γ-butyrolactone, 355 g of monoethanolamine and 86 g of water were charged and heated at 260°C to initiate the reaction in accordance with the process of Example 1. After 1 hour from the initiation of the reaction, 86 g of water was supplied to the reaction by a plunger pump over a period of about 10 minutes. The reaction was continued for the total reaction period of 3 hours. After the reaction, the reaction product was distilled in accordance with the process of Example 1. The yield of N-(β-hydroxyethyl)-2-pyrrolidone was 96.5 mole percent.

EXAMPLE 9

In the autoclave of Example 1, 500 g of γ-butyrolactone and 355 g of monoethanolamine were charged and heated at 260°C to initiate the reaction in accordance with the process of Example 1. Thirty (30) minutes after the initiation of the reaction, 172 g of water was supplied to the reactor by a plunger pump over a period of 30 minutes. The reaction was continued for 2 additional hours.

After the reaction, the reaction product was distilled in accordance with the process of Example 1. A gas chromatographic analysis indicated that the yield of product was 96.0 mole percent.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a process for preparing N-(β-hydroxyethyl)-2-pyrrolidone by reacting γ-butyrolactone with monoethanolamine at a temperature of 150° – 400°C under a pressure which is at least the pressure of water at the reaction temperature selected, the improvement which comprises:

adding water to the condensation reaction system, in an amount of more than about 3 percent by weight based on the total weight of γ-butyrolactone and monoethanolamine.

2. The process according to claim 1, wherein the amount of water added to the reaction system to the total weight of γ-butyrolactone and monoethanolamine is in the range of 5–100 percent by weight.

3. The process according to claim 1, wherein water is added to the condensation reaction system at the initiation of the reaction.

4. The process according to claim 1, wherein water is added to the condensation reaction system in the initial stages of the reaction.

5. The process according to claim 1, wherein water is added to the condensation reaction system during the reaction.

6. The process according to claim 1, wherein an equimolar amount of a 5–10 mole percent excess of γ-butyrolactone to monoethanolamine is used.

7. The process according to claim 1, wherein the condensation reaction is performed in a sealed reactor.

* * * * *